US008108520B2

(12) United States Patent
Ruutu et al.

(10) Patent No.: US 8,108,520 B2
(45) Date of Patent: Jan. 31, 2012

(54) APPARATUS AND METHOD FOR PROVIDING QUALITY OF SERVICE FOR A NETWORK DATA CONNECTION

(75) Inventors: Jussi Ruutu, Espoo (FI); Jose Costa-Requena, Helsinki (FI); Kalevi Kilkki, Espoo (FI); Ossi Korhonen, Vantaa (FI); Marko Suoknuuti, Espoo (FI)

(73) Assignee: Nokia Corporation, Espoo (FI)

( * ) Notice: Subject to any disclaimer, the term of this patent is extended or adjusted under 35 U.S.C. 154(b) by 1563 days.

(21) Appl. No.: 10/465,519

(22) Filed: Jun. 19, 2003

(65) Prior Publication Data

US 2004/0260750 A1 Dec. 23, 2004

(51) Int. Cl.
*G06F 15/173* (2006.01)

(52) U.S. Cl. ..... 709/226; 709/230; 709/235; 370/395.21

(58) Field of Classification Search .............. 709/226, 709/230, 235; 370/395.21
See application file for complete search history.

(56) References Cited

U.S. PATENT DOCUMENTS

| | | | | |
|---|---|---|---|---|
| 6,690,929 | B1* | 2/2004 | Yeh | 455/406 |
| 7,065,092 | B2* | 6/2006 | Chen et al. | 370/395.52 |
| 7,076,552 | B2* | 7/2006 | Mandato | 709/226 |
| 7,178,153 | B1* | 2/2007 | Surlaker et al. | 719/328 |
| 7,185,070 | B2* | 2/2007 | Paul et al. | 709/220 |
| 2001/0032232 | A1* | 10/2001 | Zombek et al. | 709/201 |
| 2002/0098840 | A1* | 7/2002 | Hanson et al. | 455/435 |
| 2003/0012207 | A1* | 1/2003 | Klaghofer et al. | 370/401 |
| 2004/0044798 | A1* | 3/2004 | Elzur et al. | 709/250 |
| 2004/0082338 | A1* | 4/2004 | Norrgard et al. | 455/452.2 |
| 2004/0153551 | A1 | 8/2004 | Haumont | |
| 2004/0170150 | A1* | 9/2004 | Guo et al. | 370/338 |
| 2005/0060425 | A1 | 3/2005 | Yeh et al. | |
| 2010/0169898 | A1* | 7/2010 | Quarre et al. | 719/323 |

OTHER PUBLICATIONS

Microsoft Corporation, "Windows Sockets 2", printed from Internet Feb. 24, 2004.
Mahmound, "Network Programming with Java 2 Platform, Standard Edition 1.1 (J2SE)", Sep. 3, 2002.
Aberg, "OSS through Java™ Initiative", OSS Quality of Service API Version 1.0 Overview (Part 1), 2001.
Almesberger, "Linux Traffic Control-Next Generation", Oct. 18, 2002.
Aug. 2001, Aran technologies, "Intelligent Service Assurance in 3G", www.arantech.com.
3GPP, "Quality of Service (QoS) concept and architecture" 3GPPP TS 23.107 v5.8.0, Mar. 2003.
Hubert, "Linux Advanced Routing & Traffic Control HOWTO", Oct. 29, 2003.

* cited by examiner

*Primary Examiner* — Mohamed Ibrahim
(74) *Attorney, Agent, or Firm* — Hollingsworth & Funk, LLC (57) ABSTRACT

A system, apparatus, and method are disclosed for providing quality of service (QoS) for a network data connection. The network data connection uses a network protocol selectable from a plurality of network protocols. A QoS module can receive a request for a generic QoS and apply this to the network protocol using a specific QoS associated with the protocol. The QoS module may include features for automatic management of QoS and a user interface for changing data connection parameters.

31 Claims, 5 Drawing Sheets

APPARATUS AND METHOD FOR PROVIDING QUALITY OF SERVICE FOR A NETWORK DATA CONNECTION

FIELD OF THE INVENTION

This invention relates in general to data communications, and more particularly to an apparatus and method for providing quality of service for a network data connection.

BACKGROUND OF THE INVENTION

Advances in communication infrastructures and protocols have turned standard computing devices into valuable communications tools. Computers communicate with each other, and with other electronic devices, over networks ranging from Local Area Networks (LANs) to wide reaching Global Area Networks (GANs) such as the Internet. In addition, wireless communications devices, such as mobile phones, Personal Digital Assistants (PDAs), and the like, have been increasingly designed to interface with these digital networks.

Today, such wireless devices are being used for a variety of different types of communication. For example, current and anticipated mobile phone technologies have transformed wireless devices into powerful communication tools capable of communicating voice, data, images, video, and other multimedia content. Mobile phones, at one time solely a voice communication tool, now often include network communication capabilities such as e-mail, World Wide Web browsing, etc.

With the integration of wireless and landline network infrastructures, a multitude of new services are arising, and various information types can be conveniently communicated between wireless and/or landline terminals. As a result, devices that access these services are dealing with a wide variety of network and communications protocols. Some of these protocols are specialized for mobile terminals, and others like Internet protocols were not particularly designed for mobile terminals, but are useful nonetheless for mobile terminals due to their ubiquity. It is advantageous to include features in mobile terminals that allow access to data using many types of protocols, and in particular to allow accessing multimedia content over those protocols.

One important concern in providing more advanced multimedia data involves providing assurances of Quality of Service (QoS) over data links. Historically, digital network data transfer dealt with exchanging messages and files over the network. Therefore, digital data transmission technologies such as TCP/IP were initially focused on providing transfer of complete and uncorrupted data from one computer to another. Much of this data transfer was "bursty", meaning most of the data transferred for any given transaction occurred using the maximum available bandwidth over a small period of time.

Further, although fast data transfer is always the goal of any network, the timing or ordering of data packets was not critical, as long as in the end the total transaction was completed quickly with all data accurately and completely transferred. Since these traditional uses were forgiving of latencies and unpredictable packet delays in favor of reliable transport (i.e. every byte gets transferred correctly), the networks could use many techniques such as retransmissions and dynamic packet routing to avoid contention and improve robustness.

In contrast, streaming media such as audio and video is very unforgiving of latency and delay. Latency and delay leads to perceptible dropouts and other degradation of the end signal. On the other hand, unlike file transfers, multimedia streams are sometimes forgiving of the occasional lost packets of data, as long as the packet of data following the lost one arrives at the appropriate time. Further, multimedia streams are not bursty—they rely on some minimum level of bandwidth to work effectively, but rarely, if ever, need to exceed that minimum bandwidth for a given quality of media. Therefore, multimedia applications in particular can benefit from some level of predictable network QoS.

To address these issues, certain modifications were made to existing protocols such as TCP/IP in an attempt to provide QoS, and protocols such as ATM were devised with QoS in mind from the inception. In general, these efforts have included both the IP protocol (layer 3 OSI model) as well as access technologies and protocols (layer 2 in OSI model). The end result is that there exist a number of methods for provisioning of Quality of Service both at different layers of OSI model. As a result, the QoS standards vary widely, and most application level use of QoS is ad hoc and highly dependent on the underlying network protocols. For now, application developers find it difficult to implement QoS features in products such as multimedia applications because of the state of flux in QoS implementation and the varied ways in which it can be implemented. The programming overhead needed to independently implement QoS features in an application is daunting, particularly when the applications must work in multi-protocol networking environments. Moreover, the application developer is expected to understand the underlying QoS mechanisms and involved network protocols to efficiently deploy QoS features. Accordingly, there is a need to enable application developers to easily include QoS features in their products, particularly in devices and systems that utilize multiple networking protocols.

SUMMARY OF THE INVENTION

The disclosure relates to a system, apparatus and method for providing quality of service over a network data connection associated with a network protocol available from a plurality of network protocols. In one embodiment, a method includes opening the network data connection using one or more network protocol parameters associated with the network protocol. A generic quality of service parameter is communicated to a quality of service module. The quality of service module is used to produce a specific quality of service parameter associated with the network protocol from the generic quality of service parameter. The specific quality of service parameter is then applied to the network data connection.

In another embodiment of the present invention, a generic computing device for communicating over one or more network data connections includes a processing system and one or more user applications operable via the processing system for communicating over the network data connections. A plurality of protocol modules is operable via the processing system for facilitating communications over the network data connections. A quality of service module is operable via the processing system to receive a generic quality of service parameter from the user applications and apply a specific quality of service to the protocol modules.

In another embodiment of the present invention, a computer-readable medium provides quality of service over a network data connection associated with a user application operable using a network protocol selectable from a plurality of network protocols. The computer readable medium is configured with instructions for causing a computing device to perform steps involving sending a request for a generic quality of service parameter from the user application to a quality of service module, transforming the generic quality of service parameter to a specific quality of service parameter associated with the network data connection, and applying the specific quality of service parameter from the quality of service module to the network data connection.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present disclosure describes a software module according to embodiments of the present invention that enables abstraction of the details of network Quality of Service (QoS) configuration. This module allows application developers to implement QoS functionality in software applications without concern for the underlying network protocols and/or operating systems. This module allows application developers to request QoS capabilities available from the underlying network and/or operating systems. The module will be described hereinbelow in terms of software implementations, although those skilled in the art will readily appreciate that embodiments of the present invention may be implemented using any combination of hardware, software, or firmware.

In most networking applications, QoS refers to the capability of communication networks to meet the bandwidth, delay and packet loss requirements of applications using data packet transport services. There are existing standards for providing QoS over various networking technologies, and some standards are still in evolution. In IP networks, two approaches for providing QoS are notable: Type of Service (TOS) routing and Differentiated Services.

TOS routing is an early approach and involves setting bits in the IP header to specify levels of delay, throughput, and reliability of IP packet delivery. Support for the original TOS headers fell out of use with the advent of networks that would create specialized priorities based on the content of the data streams. This content was usually derived by examining the TCP and UDP ports, which are typically associated with known applications.

Differentiated services is an approach that revived the use of the TOS header fields. Differentiated services involves setting bits in the TOS octet at network edges and administrative boundaries, using those bits to determine how packets are treated by the routers inside the network, and conditioning the marked packets at network boundaries in accordance with the requirements of each service.

Although IP is the standard for Internet communications, other networking technologies are pervasive in the realm of wireless mobile devices. These mobile technologies have their own unique challenges and procedures for providing QoS. In one example, the Third-Generation Partnership Project (3GPP) has standardized QoS classes under 3GPP technical specification TS23.107. This specification defines certain classes of QoS for use with Universal Mobile Telecommunication System (UMTS) networks.

An issue facing system designers of digital computing and communications devices is how the QoS capabilities should be seen at the terminal or at the server using the QoS supported networks. In one embodiment of the present invention, a QoS module presents an Application Program Interface (API) usable by end-application developers. The QoS API may be accessed directly by the user, or indirectly, such as in system networking libraries. By placing the complexities of QoS behind a uniform and simplified API, the end application developers can easily and consistently utilize QoS features without worrying about the underlying protocols that support QoS.

Figure 1:
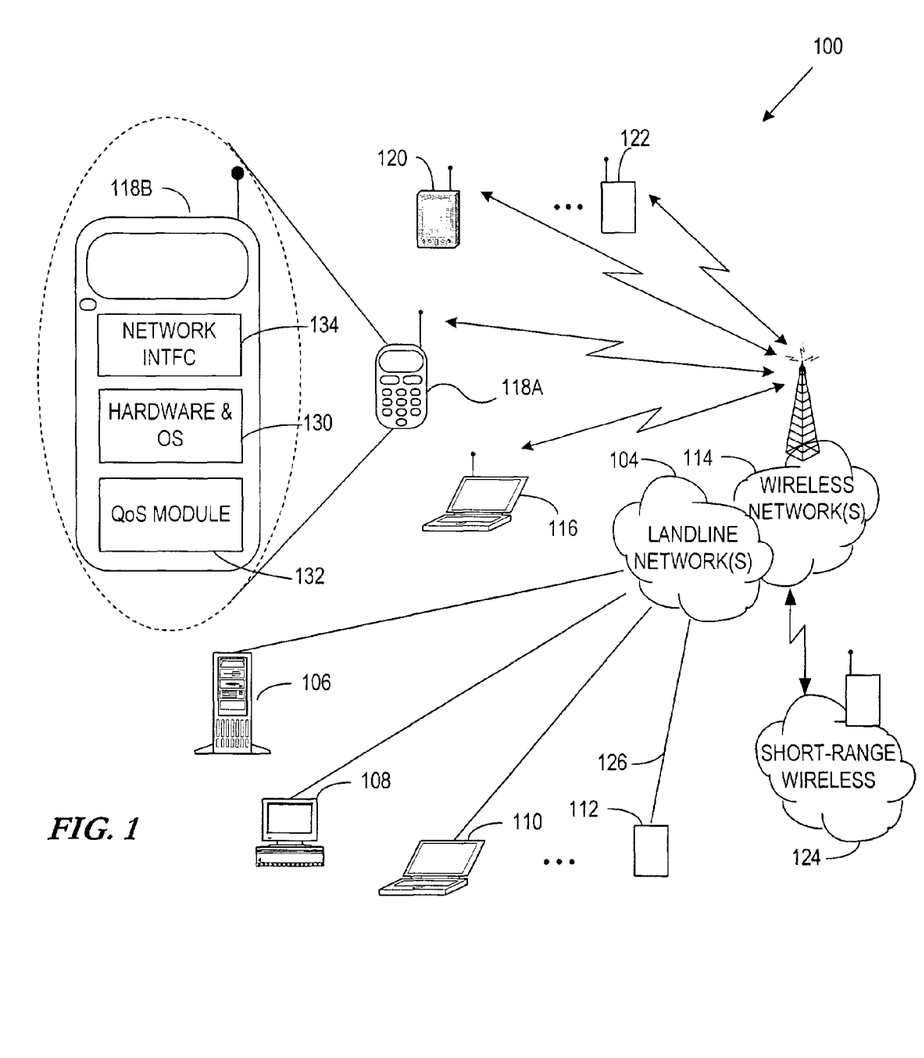
FIG. 1 is a block diagram illustrating a representative QoS application environment in accordance embodiments of the present invention.

In reference now to FIG. 1, a representative system environment 100 is shown in which QoS modules according to embodiments of the present invention may be employed. Any computing device or other electronic device that supports data over any other existing or future network protocols may be the target system that utilizes the present invention. These target systems include servers 106, desktop computers 108 or workstations, laptop or other portable computers 110, or any other similar computing device capable of communicating via the network 104, as represented by generic device 112.

In the system environment 100, data may be communicated between devices in any number of known manners. These manners include via a landline network(s) 104, which may include a Global Area Network (GAN) such as the Internet, one or more Wide Area Networks (WAN), Local Area Networks (LAN), and the like. Embodiments of the present invention may be used on devices communicating using any protocols of the network 104, including Transmission Control Protocol over the Internet Protocol (TCP/IP), Universal Datagram Protocol over IP (UDP/IP), Asynchronous Transfer Mode (ATM), X.25, High Level Data Link Control (HDLC), Fiber Distributed Data Interface (FDDI), or other wire or fiber network technologies.

The data communications may be provided via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device that can communicate using a network interface can interface with a target system that utilizes concepts according to the present invention, such as laptop or other portable computers 116, mobile phones 118A and other mobile communicators, Personal Digital Assistants (PDA) 120, or any other similar computing device capable of communicating via the wireless network 114, as represented by generic device 122.

Data may be transferred between devices using short-range wireless technologies 124, such as Bluetooth, Wireless Local Area Network (WLAN), infrared (IR), Universal Mobile Telecommunications System (UMTS), etc. Data can also be distributed using direct wired connections, such as depicted by connection path 126. The present invention is applicable regardless of the manner in which the data is provided or distributed between the target devices.

An example of a target device configured according to embodiments of the present invention is illustrated as the mobile phone 118B. The device 118B includes, hardware (e.g. processor, memory. data bus) coupled to an operating system (OS) 130. A network interface 134 provides connectivity to the various networks such as the wireless network 114. The network interface 134 can include one or more wired or wireless physical interfaces as well as hardware, firmware, and software drivers.

A device 118B according to embodiments of the present invention includes a QoS module 132 that may be implemented as firmware, a module, or a program running on the OS 130. The QoS module 132 can be used in any type of OS 130, including various versions of Windows®, Linux, Unix®, PalmOS®, Symbian OS, etc.

Figure 2:
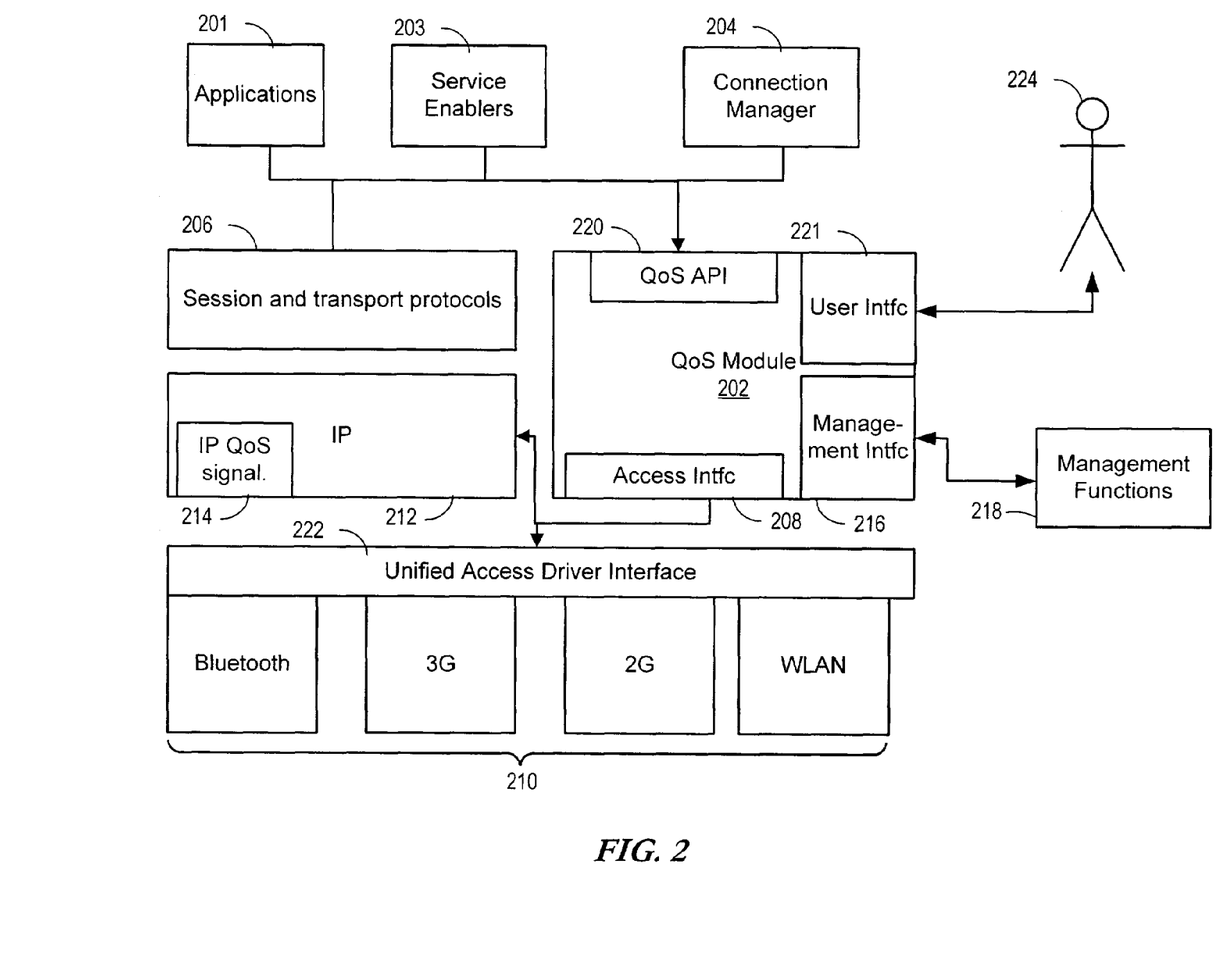
FIG. 2 is a component diagram showing QoS module communications with other software modules according to embodiments of the present invention.

In reference now to FIG. 2, various communications between a QoS module 202 and various other architectural entities are illustrated. The QoS module includes an API 220 for use by applications 201 and service enablers 203. The applications and service enablers 201, 203 may include typical application level programs (e.g. email, text messaging, multimedia communications) as well as commonly interfaced modules that can be used by multiple applications (e.g. address book, billing, authentication).

Most of the software that the user sees and interacts with is included in the applications 201. The service enablers in 203 may be directly accessed by the user, but more typically the service enablers 203 are accessed, directly or indirectly, through applications 201. The service enablers 203 may provide such functionality as device management and control, ID/authentication, payment mechanisms, presence control, etc. In general, the service enablers 203 provide application level functionality that preferably remains consistent among all user applications 201. By using service enablers 203, applications 201 can ensure consistent behavior for shared functionality on the target system.

The operation of the QoS module 202 can involve communications with many other entities including the device drivers 210, since many QoS parameters are set at this layer. Other software components, protocols, and layers may also require interfacing with the QoS module 202 for QoS actions and configurations. For example, the Service Description Protocol (SDP) is often used with the Session Initiation Protocol (SIP) to define QoS of network multimedia sessions. Both SIP and SDP can be used together in setting up sessions between computers. When initiating these sessions, the SDP headers may utilize QoS parameters in describing the multimedia sessions. The QoS module 202 can be accessed through the API 220 in order to request the QoS capabilities and map them into SDP parameters. Thus, the QoS information is widely available and understood by many signaling protocols that use SDP for media description.

The QoS module 202 and related API 220 support services for multi-access terminals and servers. The QoS module 202 supports QoS requests from applications and services of the architecture, and relays those requests to the appropriate lower level layers. The QoS module 202 contains interfaces for communicating with the lower level layers of the architecture in order to relay the QoS requests. The QoS module 202 may also contain management interfaces for managing aspects of QoS services across the system.

The QoS module 202 may have a passive role for handling application or service enabler informational queries for requesting available QoS characteristics on the underlying platform. Moreover, the QoS module 202 may have an active role for requesting/controlling QoS requirements from the application 201 or service enablers 203. Part of this active role can consist of maintaining QoS states about that the application 201 or service enabler 203 requested. In case the QoS changes from the initial requests, the QoS module 202 will inform the application 201 or service enabler 203 in order to accommodate the new QoS characteristics and/or drop the ongoing session and initiate a new one with new QoS parameters or using new transport or access. The QoS module 202 can act as a common entry point for applications requesting QoS services.

Management functions of the QoS module 202 may include such tasks as device management and user profile functions. The QoS module may contain QoS configuration information for various system devices, and may apply those configurations directly to device drivers 210 or to a generic driver interface, such as an access driver interface 222. The access driver interface 222 can act as an intermediary that provides various multiple device drivers with a generic, uniform interface.

In this example, the access driver interface 222 acts as an intermediary between the system's communications interfaces (e.g. network layer protocol 212) and the communications device drivers 210. The access driver interface 222 abstracts the concept of communications access technologies and provides a set of common functions to the higher layers regardless of the actual access technologies. The access driver interface 222 may also provide some access technology management functions, such as discovery of available communications access technologies.

A connection manager 204 is shown in FIG. 2. In general, the connection manager 204 handles setup of data connections. For example, the connection manager 204 may open TCP sockets and activate the appropriate access bearer for those sockets. The connection manager 204 may also set up system-wide connection policies and configuration dealing with data communications. These policies may include such tasks as allowing/denying the running of service processes (e.g. listening sockets), connection protocol preferences, and security settings.

To allow QoS configuration with network connections, the connection manager 204 may communicate with the QoS module 202. As part of this setup, the connection manager 204 may provide default settings for use by the system, as well as policies that allow changing QoS based on the type of application or costs associated with QoS (e.g. peak-hour billing rates).

The session and transport protocol modules 206 may also communication with the QoS module 202 through QoS API 220. The session and transport protocol modules 206 may require QoS parameters for local queuing and scheduling for both incoming and outgoing data streams. These modules 206 may also be configured to communicate to the QoS module through an access interface 208.

The QoS access interface 208 can be used to communicate with low-level protocols and software modules. This may include communicating with a generic access interface 222, which in this example provides a generic interface to wireless device drivers 210. The QoS module 202 may also provide QoS signaling over IP networks, which involves setting IP header values. This can be accomplished by communicating over the access interface 208 to the IP protocol stack 212, in particular the IP signaling portion 214 of the IP stack 212. Currently, the access interface 208 may set QoS over IP using the Resource Reservation Protocol (RSVP). RSVP provides receiver-initiated setup of resource reservations for multicast or unicast data flows. However, other IP extensions may provide QoS signaling in the future, such as the Next Steps in Signaling (NSIS), currently in work by the Internet Engineering Task Force (IETF).

One advantage of a separate QoS module 202 is the ability to centrally manage aspects of QoS for the entire system. To that end, the QoS module 202 includes a management interface 216 for communication with an external manager 218. Management functions provided by the interface 216 and external manager 218 may include device management that deals with technical aspects of the QoS module 202, and user profile functions to deal with configuration aspects of QoS. One part of user profile functionality is the consideration of cost in selecting various levels of QoS. For example, the user may want to restrict higher QoS (thus higher cost) connections to certain critical functions or services. The manager 218 may allow the user to take advantage of non-peak network time by automatically changing QoS at certain times or network conditions so that the user can utilize the highest QoS available for a given cost.

The selection of QoS can have an impact on cost of communications as well as the quality of communications. Therefore, the QoS module may advantageously include a user interface 221 to obtain decisions on QoS that should be left to the user 224. The user interface 221 may include various dialogs for communicating QoS related messages to users, as well as configuration panels. The user interface 221 may be configured to act alone (such as in a system control panel or configuration module) and/or in response to other applications (such as in response to an application menu selection).

Figure 3:
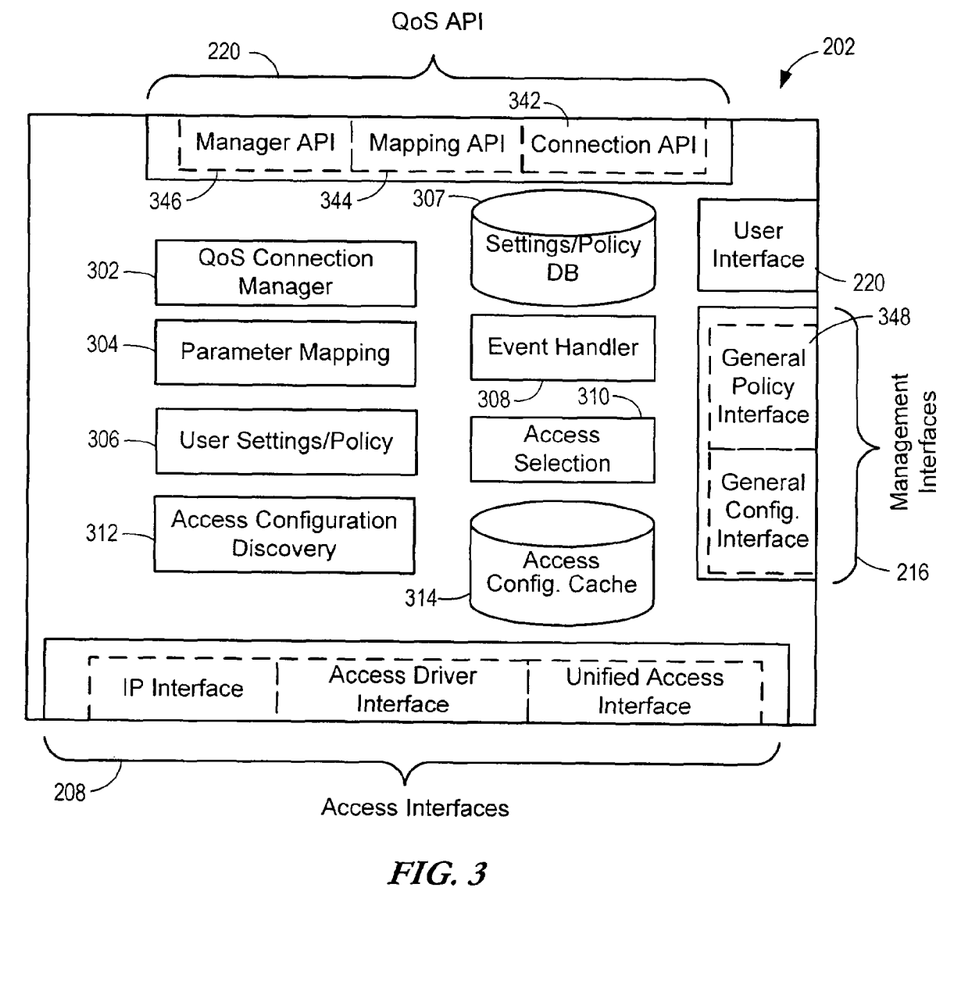
FIG. 3 is a sub-component diagrams showing arrangement of sub-modules within a QoS module according to embodiments of the present invention.

One arrangement of a QoS module 202 is shown in FIG. 3. The module 202 includes the interfaces shown in FIG. 2, namely the QoS API 220, the access interface 208, the management interface 216, and the user interface 221. Various functional components are also shown in FIG. 3. These components provide various functions associated with the QoS module 202. It will be readily appreciated that this functionality may be included entirely within the QoS module 202, or shared among other system modules as appropriate.

As was shown in FIG. 2, a connection manager 204 was used to establish and maintain network connections at a system level. Similarly, the QoS module may contain a QoS connection manager 302 to activate QoS related actions. For example, the QoS connection manager 302 can be used to open a connection with a given QoS. The QoS connection manager 302 is preferably arranged to communicate through a connection API 342, which is a subset of the QoS API 220.

The QoS connection manager 302 can be used as the generic control unit of the QoS module 202. For example, the QoS connection manager 302 can be used to control various other components. The connection manager 302 can be arranged to perform tasks such as opening TCP sockets or requesting the establishment of the data bearer at access layer.

The connection manager 302 is preferably enabled to query, modify, and terminate the connections that it has opened.

In one arrangement, the QoS connection manager 302 shares responsibilities with the external connection manager 204 (see FIG. 2). For example, an application can request a connection over the QoS API 220, and the QoS connection manager 302 can then use the external connection manager 204 to open the connections. The QoS connection manager 302 then modifies the connections with the desired QoS.

The QoS connection manager 302 may also be configured to actively adjust the operation of access interfaces (e.g. through access interfaces 208) if needed for maintaining the desired QoS level. This adjustment of QoS may occur manually or automatically, and is typically enforced by higher level policies of the QoS module 202.

The parameter mapping component 304 is generally responsible for converting or mapping between various kinds of QoS parameters. These parameters may include various access technology specific parameters (such as those defined by 3GPP in TS23.107) as well as generic QoS parameters (such as simply bandwidth and delay). The parameter mapping component 304 allows applications or other entities to provide as input the QoS parameters in one (preferably generic) format and get as output one or more sets of parameters in other specific format(s).

Note that the parameter mapping functionality can be used by several entities outside the QoS module 202 (see FIG. 2), such as applications 201, service enablers 203, and the external connection manager 204. These outside entities would communicate using the mapping API 344, which is shown here as part of the QoS API 220. Of course, any internal components such as the QoS connection manager 302 could also directly utilize the functionality of the parameter mapping component 304.

The ability to uniformly set QoS policy when communicating over different connections is useful when it is desired to present a uniform QoS interface to the user. To enable user settings and policies regarding QoS, a user settings/policy component 306 is included in the QoS module 202. The user settings/policy component 306 is responsible for applying and learning the user preferences related to QoS. The settings/policy component 306 can store settings and policies provided by the service provider or network operator in a settings and policy database 307. The polices and settings may be applied or determined through a management API 346 of the QoS API 220, or through a general policy interface 348 of the management interface 216. If the policies were provided by a source other than the user, the user would generally have to approve the downloading of those policies/settings.

For example, these QoS policies stored by the user settings/policy component 306 may include settings such as "always use 3GPP background traffic class without consulting the end user, but for conversational traffic class always consult the end user through the user interface." The user settings/policy component 306 may also have connections to other related functionalities, such as billing or security functions. For example, there may be settings/policies related to billing such as "if cost is higher than X EUR/minute then do not use this QoS." It is also possible that policies/settings provided by the service provider or network operator are stored using the settings/policy component 306. These related policies may be stored to the settings and policy database 307 or fetched from external policy databases (e.g. those databases outside the QoS module 202).

The QoS module 202 includes an event handler 308 for monitoring and relaying information about QoS related events. For example, an application 201, a service enabler 203, or the external connection manager 204 can register with the event handler 308 to be notified if QoS level decreases below some level. The event handler 308 can monitor QoS level, through such interfaces as the access or management interfaces 208, 216. The event handler 408 can also send notifications through these interfaces when an event occurs.

The event handler 308 may also be used to track the QoS module 202 internal operations. For example, when requests or connections are initiated internally, the event handler 308 can register for these events and responses to those events just as if they were externally initiated.

The access selection component 310 can generally act to select the right access technology when there are several choices. For example, if an application wants to have 50 kbit/s data throughput with real time requirements, the access selection component 310 can selects UMTS and block or omit GSM. Notice that in some cases this unit may not be needed in QoS Module since it may be part of the generic access interface 222 or external connection manager 204 (see FIG. 2).

The access configuration discovery component 312 is used for probing the available access technologies and their QoS capabilities through the access interfaces 208. This component 312 may also need to access user identity information to verify accessible services. User smart cards such as Universal Subscriber Identity Modules (USIM) may be accessed by the access configuration discovery component 312 to discover the user's available subscriptions.

The access configuration cache 314 is a database that stores the information about available access technologies and their QoS capabilities. Use of the access configuration cache 314 reduces the need to poll for the information when a new request comes over QoS API 220. The access configuration cache 314 can be updated automatically via a mechanism such as the event handler 308. In one arrangement, information in the access configuration cache 314 can be communicated to external databases and/or downloaded from external databases.

Figure 4:
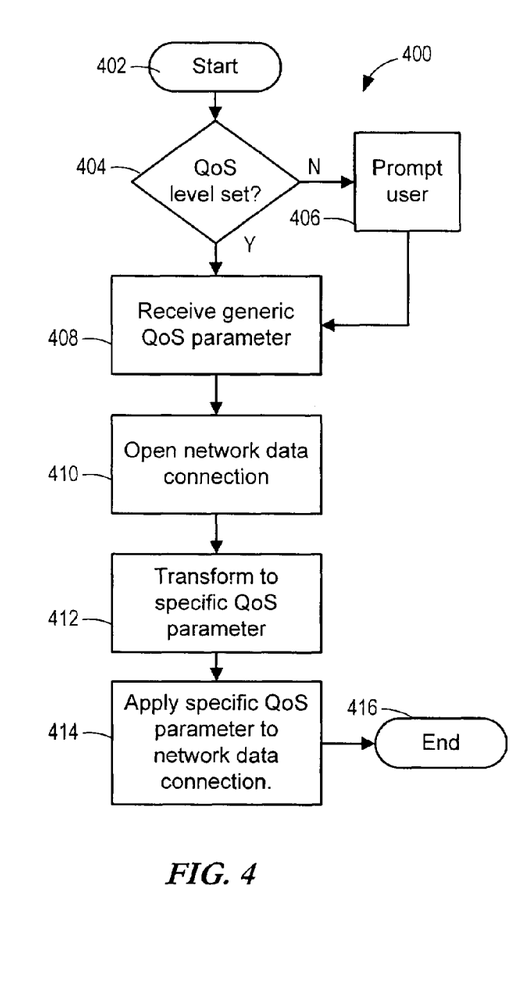
FIG. 4 is a flowchart illustrating a network connection routine according to embodiments of the present invention.

Referring now to FIG. 4, a flowchart 400 illustrates an example procedure that may be used by a QoS module 202 when initiating one or more network connections for a computing device. After entering 402 the routine 400, a check 404 is made to determine whether the generic QoS level is set. The generic QoS level may include a single setting or a policy that guides the management of multiple settings based on variables such as cost and availability. If the check 404 determines that a QoS level must be determined by the user, the user can be prompted 406.

Next, the generic QoS parameter is received 408 from any number of sources. The generic QoS may be sent from another application, from the user prompt 406, or from some system setting or policy. The network data connection can then be opened 410, the generic QoS parameter transformed 412 to a specific QoS parameter, and the specific QoS parameter applied 414 to the network data connection. At this point, the routine 400 exits 416.

Figure 5:
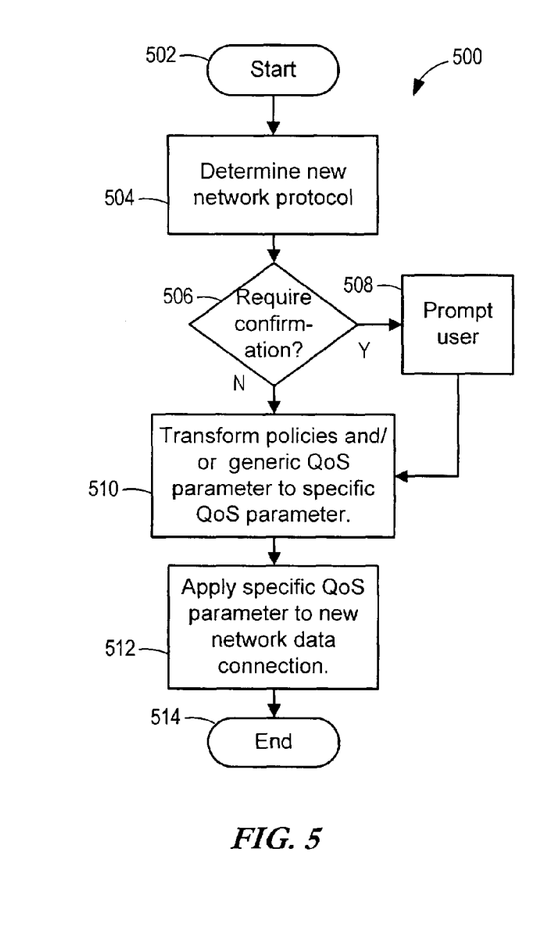
FIG. 5 is a flowchart showing a routine for modifying a network connection according to embodiments of the present invention.

Once a network data connection has been opened, an outside event may require that the computing device use a different network protocol and/or network medium. The outside events may include such occurrences as the loss or switching of network links and/or providers. This may require that the QoS module 202 apply a different specific QoS parameter to the new connection. This situation is illustrated in the flowchart 500 of FIG. 5. The flowchart 500 begins 502 by determining 504 the new network protocol. The determination 504 of a new protocol may be manual (e.g. selected by user) or automatic. A check 506 may be required to determine if the user must approve the change. This check 506 may be required if, for example, the change means a higher billing rate. If user confirmation is needed, the user is prompted 508. Next the specific QoS parameter is determined 510 from the generic QoS parameter and/or policy. The specific QoS parameter is applied 512 to the new network data connection, and the routine exits 514.

Once the target system is in operation and network connections have been established, the QoS module 202 may be used to handle various tasks and system events. For example, the QoS module 202 may maintain QoS to some predetermined state, notify users about changes regarding an available QoS, and respond to QoS queries from user applications and system software. One example of event handling is shown in the flowchart 600 in FIG. 6. The flowchart 600 illustrates some tasks that may be handled in an "infinite" event loop, such as might be implemented in an event handler 308 (shown in FIG. 3).

Figure 6:
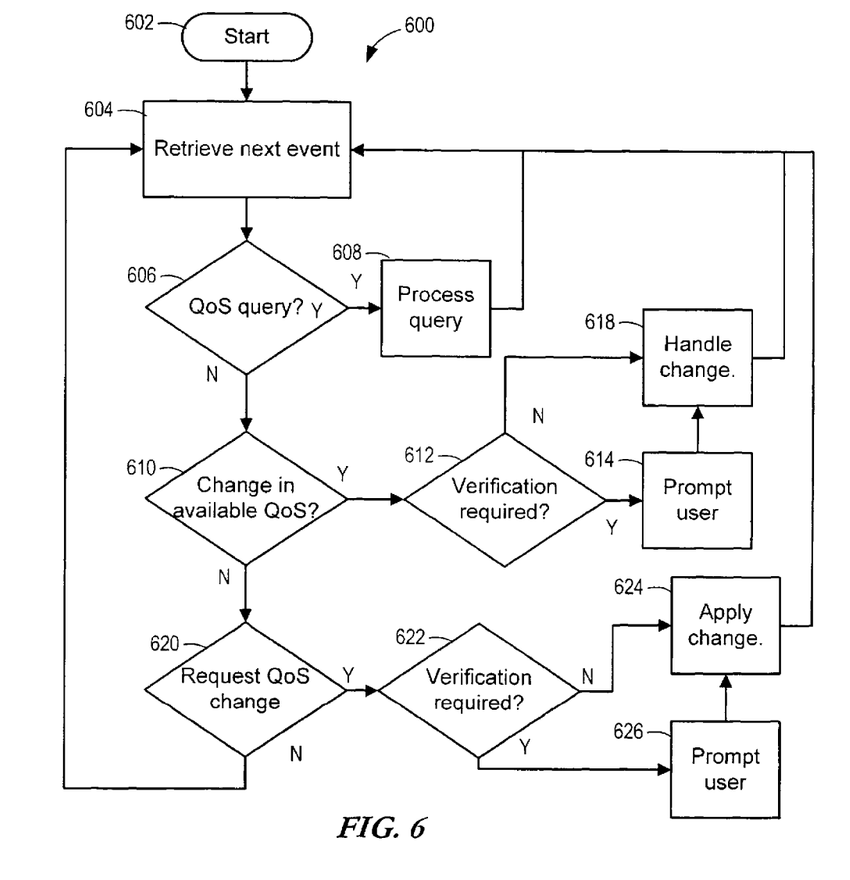
FIG. 6 is a flowchart showing an event handling routine according to embodiments of the present invention.

The entry point 602 of the routine is typically entered once in this infinite loop arrangement. After entry 602, an event is retrieved 604. The event may be retrieved 604 from a list or queue. The event handling may be implemented in a separate process or thread of execution, so that the routine can block while waiting for events to be received. After retrieving the event 604, the remainder of the routine involves checking the type of event and invoking the appropriate handler. In this example, three events are handled. These events include QoS queries 606, changes in available Qos 610, and a user or system request for QoS changes 620.

If the received event is a QoS query 606, the query is simply processed 608 and the loop continues with the next event 604. If the event is a change in available QoS 610 on one or more network connections, the event may be checked 612 against local policies to see if verification is needed to process this change. The change in QoS may be, for example, an increase or decrease in available QoS on a network data connection. If verification is required, the user is prompted 614 before proceeded to handle 618 the network change.

The received event may be a request for change of QoS 620. For example, a user application may want to increase or decrease QoS over a network data connection. In this case, the local policies are checked 622 to see if the user must verify this change. If so, the user is prompted 626 before applying the change 624. Otherwise the change is applied 624 automatically.

It will be appreciated that the example routines provided are only illustrative of typical functions that might be implemented in a QoS module 202 according to embodiments of the present invention. Any manner of algorithms and procedures may be used to implement the described functionality. For example, the event loop in FIG. 6 may be implemented as a function lookup table, and the received event is used to index a table entry containing the function to be executed.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, the QoS module may be implemented as part of an operating system kernel, kernel module, system runtime library, and/or application level library. It is intended that the scope of the invention be limited not with this detailed description, but rather defined by the claims appended hereto.

What is claimed is:

1. A method comprising:
   receiving a request for a generic quality of service level associated with a network connection, wherein the requested generic quality of service level is directed to a generic quality of service application program interface that is coupled to a unified access driver interface, wherein the unified access driver interface and the generic quality of service application program interface operate together to abstract communications access technologies within an apparatus and provide a set of common functions to higher layers regardless of which of a plurality of wireless access protocols is used by lower level layers of a network access architecture of the apparatus;
   selecting a specific network access driver and a specific quality of service parameter associated with the specific network access driver and based on the generic quality of service parameter;
   applying the specific quality of service parameter to the network connection via the unified access driver interface; and
   in response to a system event that necessitates a change to the network connection in accordance with a quality of service policy, modifying the network connection by applying a different specific quality of service parameter to the network connection, wherein the quality of service policy governs the selection of the requested generic quality of service level based on any combination of the requested quality of service level, availability of the requested quality of service level, and a service billing rate associated with the requested generic quality of service level.

2. The method of claim 1, further comprising presenting a user interface for facilitating user selection of the requested generic quality of service level.

3. The method of claim 2, further comprising:
   detecting a change in an available quality of service of the network connection; and
   notifying the user regarding the change of the available quality of service via the user interface.

4. The method of claim 2, further comprising facilitating user selection of the quality of service policy via the user interface.

5. The method of claim 1, further comprising:
   detecting a second network event that necessitates selecting a different specific network access driver for the network connection; and
   selecting a different specific quality of service parameter associated with the different specific network access driver based on the generic quality of service parameter of the request in response to the second network event.

6. The method of claim 1, further comprising:
   receiving, via the application program interface, a query from the program regarding an available generic quality of service associated with the network data connection; and
   determining a response via a parameter mapping component that maps between access technology specific parameters and generic quality of service parameters.

7. The method of claim 1 wherein the program comprises one or more of a user application and a service enabler of the apparatus.

8. An apparatus comprising:
   at least one processor; and
   at least one memory including computer program code, wherein the at least one memory and the computer program code are configured to, with the at least one processor, cause the apparatus at least to:
   receive a request for a generic quality of service level associated with a network connection, and wherein the requested generic quality of service level is directed to a generic quality of service application program interface that is coupled to a unified access driver interface, wherein the unified access driver interface and the generic quality of service application program interface operate together to abstract communications access technologies within the apparatus and provide a set of common functions to higher layers regardless of which of a plurality of wireless access protocols is used by lower level layers of a network access architecture of the apparatus;
   select a specific network access driver and a specific quality of service parameter associated with the specific network access driver and based on the generic quality of service parameter;
   apply the specific quality of service parameter and the specific network access driver to the network connection via the unified access driver interface; and
   in response to a system event that necessitates a change to the network connection in accordance with a quality of service policy, modify the network connection by applying a different specific quality of service parameter to the network connection, wherein the quality of service policy governs the selection of the requested generic quality of service level based on any combination of the requested quality of service level, availability of the requested quality of service level, and a service billing rate associated with the requested generic quality of service level.

9. The apparatus of claim 8, wherein the at least one memory and the computer program code are configured to, with the at least one processor, further cause the apparatus at least to present a user interface for facilitating user selection of the requested generic quality of service level.

10. The apparatus of claim 9, wherein the at least one memory and the computer program code are configured to, with the at least one processor, further cause the apparatus at least to:
    detect a change in an available quality of service of the network connection;

notify the user regarding the change of the available quality of service via the user interface.

11. The apparatus of claim 9, wherein the at least one memory and the computer program code are configured to, with the at least one processor, further cause the apparatus at least to facilitate user selection of the quality of service policy via the user interface.

12. The apparatus of claim 8, wherein the at least one memory and the computer program code are configured to, with the at least one processor, further cause the apparatus at least to:
  detect a second network event that necessitates selecting a different specific network access driver for the network connection; and
  select a different specific quality of service parameter associated with the different specific network access driver based on the generic quality of service parameter of the request in response to the second network event.

13. The apparatus of claim 8, wherein the at least one memory and the computer program code are configured to, with the at least one processor, further cause the apparatus at least to:
  receive, via the application program interface, a query from the program regarding an available generic quality of service associated with the network data connection; and
  determine a response via a parameter mapping component that maps between access technology specific parameters and generic quality of service parameters.

14. The apparatus of claim 8, wherein the program comprises one or more of a user application and a service enabler of the apparatus.

15. A non-transitory computer-usable storage medium configured with stored instructions for causing a computing device to perform:
  receiving a request for a generic quality of service level associated with a network connection, wherein the requested generic quality of service level is directed to a generic quality of service application program interface that is coupled to a unified access driver interface, wherein the unified access driver interface and the generic quality of service application program interface operate together to abstract communications access technologies within the computing device and provide a set of common functions to higher layers regardless of which of a plurality of wireless access protocols is used by lower level layers of a network access architecture of the computing device;
  selecting a specific network access driver and a specific quality of service parameter associated with the specific network access driver and based on the generic quality of service parameter;
  applying the specific quality of service parameter to the network connection via the unified access driver interface; and
  in response to a system event that necessitates a change to the network connection in accordance with a quality of service policy, modify the network connection by applying a different specific quality of service parameter to the network connection, wherein the quality of service policy governs the selection of the requested generic quality of service level based on any combination of the requested quality of service level, availability of the requested quality of service level, and a service billing rate associated with the requested generic quality of service level.

16. The computer-usable storage medium of claim 15, wherein the instructions further cause the computing device to present a user interface for facilitating user selection of the requested generic quality of service level.

17. The computer-usable storage medium of claim 16, wherein the instructions further cause the computing device to:
  detect a change in an available quality of service of the network connection;
  notifying the user regarding the change of the available quality of service via the user interface.

18. The non-transitory computer-usable storage medium of claim 16, wherein the instructions further cause the computing device to facilitate user selection of the quality of service policy via the user interface.

19. The non-transitory computer-usable storage medium of claim 15, wherein the instructions further cause the computing device to:
  detect a second network event that necessitates selecting a different specific network access driver for the network connection; and
  select a different specific quality of service parameter associated with the different specific network access driver based on the generic quality of service parameter of the request in response to the second network event.

20. The computer-usable storage medium of claim 15, wherein the instructions further cause the computing device to:
  receive, via the application program interface, a query from the program regarding an available generic quality of service associated with the network data connection; and
  determine a response via a parameter mapping component that maps between access technology specific parameters and generic quality of service parameters.

21. An apparatus comprising:
  at least one processor coupled to memory comprising computer code;
  a program operable by the processor to at least facilitate establishing a network connection in response to user requests at the apparatus;
  a unified access driver interface operable by the processor to facilitate access to a plurality of specific network access drivers for establishing the network connection; and
  a quality of service module comprising a generic quality of service application program interface that receives requested generic quality of service levels from the program, wherein the quality of service module is coupled to the unified access interface, and wherein the unified access driver interface and the generic quality of service application program interface operate together to abstract communications access technologies within the apparatus and provide a set of common functions to higher layers regardless of which of a plurality of wireless access protocols is used by lower level layers of a network access architecture of the apparatus;
  wherein the processor is operable via the computer code to cause the apparatus to:
    select a specific quality of service parameter associated with at least one of the specific network access drivers based on the requested generic quality of service parameters; and
    apply the specific quality of service parameter to the network connection via the unified access driver interface; and in response to a system event that necessitates a change to the network connection in accordance with one or more quality of service policies, modify the network connection by applying a different specific quality of service parameter to the network connection, wherein the quality of service policies govern the selection of the requested generic quality of service level based on any combination of the requested quality of service level, availability of the requested quality of service level, and a service billing rate associated with the requested generic quality of service level.

22. The apparatus of claim 21, wherein the quality of service module further comprises a user interface that facilitates user selection of one or more of the requested generic quality of service levels.

23. The apparatus of claim 22, wherein the quality of service module is further operable by the processor to detect a change in an available quality of service of the network connections and notify the user regarding the change via the user interface.

24. The apparatus of claim 21, wherein the quality of service module further comprises a management interface that facilitates central management of quality of service functions of the apparatus.

25. The apparatus of claim 21, wherein the quality of service module further comprises a policy database for managing the one or more quality of service policies.

26. An apparatus comprising:
  means for receiving a request for a generic quality of service level associated with a network connection, wherein the requested generic quality of service level is directed to a generic quality of service application program interface that is coupled to a unified access driver interface, wherein the unified access driver interface and the generic quality of service application program interface operate together to abstract communications access technologies within the apparatus and provide a set of common functions to higher layers regardless of which of a plurality of wireless access protocols is used by lower level layers of a network access architecture of the apparatus;
  means for selecting a specific network access driver and a specific quality of service parameter associated with the specific network access driver and the generic quality of service parameter;
  means for applying the specific quality of service parameter to the network connection via the unified access driver interface; and
  means for, in response to a system event that necessitates a change to the network connection in accordance with a quality of service policy, modifying the network connection by applying a different specific quality of service parameter to the network connection, wherein the quality of service policy governs the selection of the requested generic quality of service level based on any combination of the requested quality of service level, availability of the requested quality of service level, and a service billing rate associated with the requested generic quality of service level.

27. The apparatus of claim 26, further comprising means for presenting a user interface for facilitating user selection of the requested generic quality of service level.

28. The apparatus of claim 27, further comprising:
  means for detecting a change in an available quality of service of the network connection; and
  means for notifying the user regarding the change of the available quality of service via the user interface.

29. The apparatus of claim 27, further comprising means for facilitating user selection of the quality of service policy via the user interface.

30. The apparatus of claim 26, further comprising:
  means for detecting a network event that necessitates selecting a different specific network access driver for the network connection; and
  means for selecting a different specific quality of service parameter associated with the different specific network access driver based on the generic quality of service parameter of the request in response to the network event.

31. The apparatus of claim 26, further comprising:
  means for receiving, via the application program interface, a query from the program regarding an available generic quality of service associated with the network data connection; and
  means for determining a response via a parameter mapping component that maps between access technology specific parameters and generic quality of service parameters.

* * * * *

UNITED STATES PATENT AND TRADEMARK OFFICE
CERTIFICATE OF CORRECTION

PATENT NO. : 8,108,520 B2
APPLICATION NO. : 10/465519
DATED : January 31, 2012
INVENTOR(S) : Jussi Ruutu et al.

It is certified that error appears in the above-identified patent and that said Letters Patent is hereby corrected as shown below:

In the Claims

Column 14, line 1, Claim 16:
"The computer-usable" should read --The non-transitory computer-usable--.

Column 14, line 5, Claim 17:
"The computer-usable" should read --The non-transitory computer-usable--.

Column 14, line 27, Claim 20:
"The computer-usable" should read --The non-transitory computer-usable--.

Signed and Sealed this
First Day of May, 2012

David J. Kappos
*Director of the United States Patent and Trademark Office*